US012075100B2

(12) United States Patent
Giladi et al.

(10) Patent No.: US 12,075,100 B2
(45) Date of Patent: *Aug. 27, 2024

(54) PER-SEGMENT PARAMETERS FOR CONTENT

(71) Applicant: Comcast Cable Communications, LLC, Philadelphia, PA (US)

(72) Inventors: Alexander Giladi, Denver, CO (US); Weidong Mao, West Windsor, NJ (US); Jiang Xu, Highlands Ranch, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,850

(22) Filed: Apr. 24, 2023

(65) Prior Publication Data

US 2023/0412857 A1    Dec. 21, 2023

Related U.S. Application Data

(63) Continuation of application No. 17/669,019, filed on Feb. 10, 2022, now Pat. No. 11,671,636, which is a
(Continued)

(51) Int. Cl.
*H04N 7/173* (2011.01)
*H04N 21/2343* (2011.01)
(Continued)

(52) U.S. Cl.
CPC . *H04N 21/234345* (2013.01); *H04N 21/2353* (2013.01); *H04N 21/2393* (2013.01); *H04N 21/8586* (2013.01)

(58) Field of Classification Search
CPC ....... H04N 21/234345; H04N 21/2393; H04N 21/2353; H04N 21/8586
See application file for complete search history.

(56) References Cited

U.S. PATENT DOCUMENTS 10,200,424 B2    2/2019  Bekiares et al.
11,290,757 B2 *  3/2022  Giladi .............. H04N 21/23439
(Continued)

FOREIGN PATENT DOCUMENTS

CA           2964956 A1    5/2016

OTHER PUBLICATIONS

European Search Report issued in related application No. EP 19200610.4 mailed May 4, 2020.
(Continued)

*Primary Examiner* — Gigi L Dubasky
(74) *Attorney, Agent, or Firm* — Ballard Spahr LLP

(57) ABSTRACT

Per-segment parameters for content delivery are described herein. A manifest file for a segment and a parameter file for the segment may be sent to a user device. The parameter file may indicate one or more time ranges each corresponding to a parameter value. Requests for content segments based on the manifest file and the parameter file may be received. The user device may access the parameter file to determine a time range of the one or more time ranges into which a start time of a particular segment falls. The user device may determine a parameter value as corresponding to the determined time range. The user device may then generate a request to include the determined parameter value.

26 Claims, 4 Drawing Sheets

Related U.S. Application Data continuation of application No. 16/588,244, filed on Sep. 30, 2019, now Pat. No. 11,290,757.

(60) Provisional application No. 62/738,735, filed on Sep. 28, 2018.

(51) Int. Cl.
*H04N 21/235* (2011.01)
*H04N 21/239* (2011.01)
*H04N 21/858* (2011.01)

(56) References Cited

U.S. PATENT DOCUMENTS

| | | | |
|---|---|---|---|
| 11,671,636 B2* | 6/2023 | Giladi | H04N 21/234345 725/93 |
| 2010/0185362 A1 | 7/2010 | Vialatte et al. | |
| 2012/0159468 A1 | 6/2012 | Joshi et al. | |
| 2014/0032987 A1 | 1/2014 | Nagaraj et al. | |
| 2014/0156865 A1 | 6/2014 | Giladi | |
| 2014/0173677 A1 | 6/2014 | Lohmar et al. | |
| 2014/0258345 A1* | 9/2014 | Mcphillen | H04N 21/266 707/821 |
| 2014/0281009 A1 | 9/2014 | Moorthy et al. | |
| 2014/0281010 A1* | 9/2014 | Panje | H04L 65/80 709/231 |
| 2015/0100702 A1 | 4/2015 | Krishna et al. | |
| 2015/0215359 A1 | 7/2015 | Bao et al. | |
| 2015/0237166 A1 | 8/2015 | Denoual et al. | |
| 2015/0256583 A1 | 9/2015 | Rosenzweig et al. | |
| 2015/0261600 A1 | 9/2015 | Iturralde et al. | |
| 2016/0373496 A1 | 12/2016 | Yamagishi | |
| 2017/0126256 A1 | 5/2017 | Salomons et al. | |
| 2017/0230442 A1 | 8/2017 | Denoual et al. | |
| 2017/0359628 A1 | 12/2017 | Sachdev et al. | |
| 2018/0213294 A1 | 7/2018 | Lau et al. | |
| 2018/0232287 A1 | 8/2018 | Katsumata et al. | |
| 2019/0014358 A1 | 1/2019 | Takabayashi et al. | |
| 2019/0045238 A1 | 2/2019 | Lai et al. | |
| 2019/0075148 A1 | 3/2019 | Nielsen et al. | |
| 2021/0105333 A1 | 4/2021 | Chen et al. | |

OTHER PUBLICATIONS

Desaulniers, Nick. "Streaming media on demand with Media Source Extensions", Hacks.mozilla.org website, Jul. 1, 2015 retrieved on Apr. 6, 2022]. Retrieved from the Internet: <URL: https://hacks.nnozilla.org/2015/07/ streaming-media-on-demand-with-media-source-extensions/>. (Year: 2015).

Long, B. "The structure of an MPEG-DASH MPD", Brendan Long Website, Mar. 20, 2015 [retrieved on Mar. 10, 2020]. Retrieved from the Internet: <URL: https://www.brendanlong.conn/the-structure-of-an-nnpeg-dash-nnpd.htnnl>. (Year: 2015).

"Shaka 2.0 and stream interruption #555", Github.com Issues, Apr. 17, 2017 [retrieved on Dec. 16, 2020]. Retrieved from the Internet: <URL: https://github.com/google/shaka-player/issues/555>. (Year: 2017).

"Thumbnails with still images #119 issue". Dash-Industry-Forum GitHub Issue tracker website, Nov. 22, 2016 [retrieved on Mar. 6, 2024]. Retrieved from the Internet: <URL: https://github.com/Dash-Industry-Forum/DASH-IF-IOP/issues/119>. (Year: 2016).

* cited by examiner

PER-SEGMENT PARAMETERS FOR CONTENT

CROSS-REFERENCE TO RELATED PATENT APPLICATIONS

This application is a continuation of U.S. Non-provisional application Ser. No. 17/669,019, filed on Feb. 10, 2022, which is a continuation of U.S. Non-provisional application Ser. No. 16/588,244, filed on Sep. 30, 2019, and issued as U.S. Pat. No. 11,290,757 on Mar. 29, 2022, which claims priority to U.S. Provisional Application No. 62/738,735, filed on Sep. 28, 2018, all of which are incorporated by reference in their entireties herein.

BACKGROUND

Adaptive streaming, designed to deliver content items (e.g., video, etc.) to multiple users in the most efficient way possible while also providing the best quality for each specific user, requires different parameters (e.g., encoding parameters, Uniform Resource Locators (URLs), identifiers, etc.) be used for each segment of the content. Playlists and/or manifest files are used to inform users of segments of the content item available at various bit rates (e.g., various representations of the content, etc.). Playlists and/or manifest files individually list addresses and parameters for each segment of content item. As such, playlists and/or manifest files include a reference (e.g., a complete URL) for every segment and representation of the content item. Playlists and/or manifest files that individually list addresses and parameters for each segment and/or representation of content require an increased file size and increased resource requirements to parse the playlist and/or manifest file.

SUMMARY

It is to be understood that both the following general description and the following detailed description are exemplary and explanatory only and are not restrictive. Methods and systems for per-segment parameter passing are described. A content item may have multiple representations, with each representation varying in bit rate, format, and/or other parameters. Each representation of a content item may be comprised of a plurality of segments. A manifest file sent to a user device may identify Uniform Resource Locators (URLs) for each of the representations and/or segments. To request a particular segment for a particular representation, a user device may access the manifest file to determine the particular URL to send the request. In order to reduce the overall size of the manifest file, instead of individually listing each segment in the manifest file, Template elements may be used to describe a standardized naming convention for segments, from which a user device may dynamically generate requests.

In some cases a parameter may be included in the request URL that is different for each segment, but the same across all representations for that segment (e.g., forensic watermarking of content streams). This may preclude the use of Template elements, as these per-segment parameters cannot be defined according to a standard naming convention. In such instances, the segments and their corresponding parameters may be individually listed in the manifest file, resulting in an increased manifest file size and increased resource usage in parsing the manifest file to generate requests. Accordingly, a parameter file separate from the manifest file may identify a plurality of time ranges. The parameter file may also identify, for each time range, a corresponding parameter value. The corresponding parameter value may be applicable to all segments within the time range across all representations. As the parameters are not indicated in the manifest file itself, the manifest file may still use Template-based addressing schemes for generating requests for segments, thereby reducing the overall size of the manifest file. Additionally, as the manifest file may be updated during content delivery, the updated manifest files will also have similarly reduced file sizes and parsing complexity due to the use of Template elements.

This summary is not intended to identify critical or essential features of the disclosure, but merely to summarize certain features and variations thereof. Other details and features will be described in the sections that follow.

DETAILED DESCRIPTION

Figure 1:
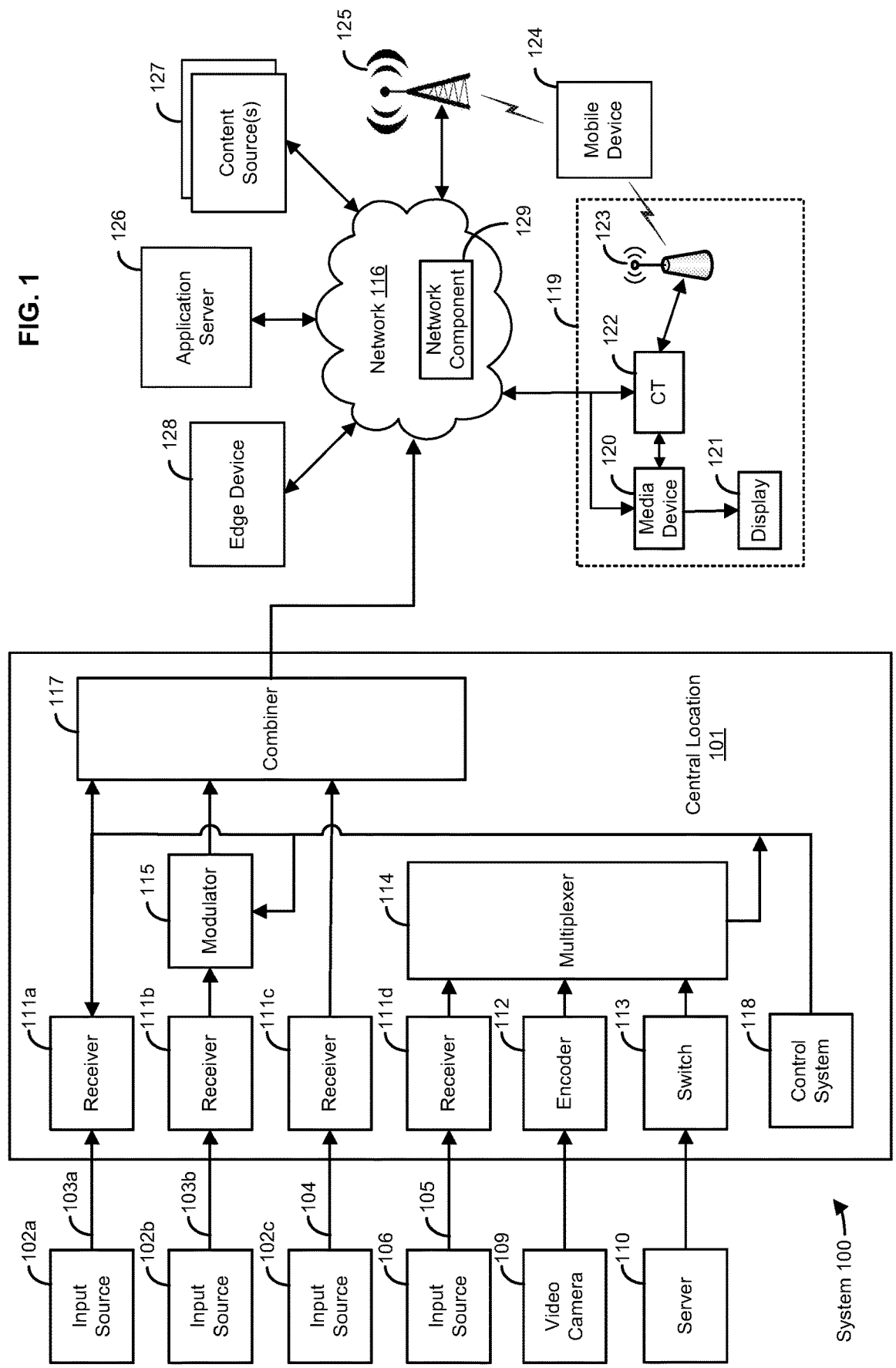
FIG. 1 shows a system for content delivery.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

A content item may correspond to multiple representations. Each representation may be a version of the same content item (e.g., the same movie or episode of a television show), but varying in format, bitrate, combinations thereof, and/or the like. Each representation may be divided into segments (e.g., one second of content, two seconds of content). A manifest file may describe each representation and includes Uniform Resource Locators (URLs) used by a user device to generate requests for segments. The manifest file may be encoded as a tree of elements (e.g., one or more parent or high-level elements, each of which may include one or more child or lower-level elements) using Extensible Markup Language (XML) or another format.

In some instances, additional parameters may be used to generate requests for segments. These parameters may be different for each segment ($S_i$) but identical across all representations of that particular segment (e.g., "per-segment" parameters). For example, a content stream may implement forensic watermarking to identify a user, account, or device accessing a content item. To do so, a given segment for a given representation may have one or more variants (e.g., an "A" variant and a "B" variant). The identifying sequence may be encoded as a sequence of "A" and/or "B" variants of a sequence of segments. Accordingly, to request a particular segment, the user device must generate a request identifying the segment (e.g., a segment number or time code), a particular representation, and a particular variant. The variant would need to be identified using an additional parameter. A manifest file may individually list, for each representation, each segment and their corresponding additional parameters (e.g., using a SegmentList element of a DASH manifest file). However, a manifest file individually listing, for each representation, each segment and their corresponding additional parameters results in a large manifest file size, increasing the network traffic required to send and update manifest files, and increasing the computational resources used by the user device to parse the manifest file. Moreover, a manifest file listing, for each representation, each segment and their corresponding additional parameters precludes the use of templates (e.g., a Template element of a DASH manifest file) to define a naming convention from which requests may be generated.

To reduce the manifest file size and resource requirements of per-segment parameters, a parameter file may be generated. The parameter file may be a file separate from the manifest file. For example, the manifest file may include a reference (e.g., a URL) identifying the parameter file. A user device may request, based on the reference in the manifest file, the parameter file. The parameter file may indicate one or more time ranges. Each time range may correspond to a particular parameter value. Accordingly, the parameter file may be considered as listing one or more key-value pairs, with a time range being the key and the parameter value being the value. To generate a request for a particular segment, the user device may determine a time value associated with the particular segment (e.g., a start time). The user device may access the parameter file to determine a time range into which the start time of the particular segment falls. The user device may determine the parameter value as corresponding to the determined time range. The user device may generate a request by modifying a URL indicated in the manifest file to include the determined parameter value. As the per-segment parameters have been removed from the manifest file, the manifest file may use templates to define a naming convention for generating requests, thereby reducing the overall manifest file size and computational complexity in parsing the manifest file. Because the manifest file may be updated during content delivery, sending an updated manifest file requires less bandwidth and computational resources due to the reduced file size.

FIG. 1 shows a system 100 for per-segment parameters for content delivery. Those skilled in the art will appreciate that digital equipment and/or analog equipment may be employed. One skilled in the art will appreciate that provided herein is a functional description and that the respective functions may be performed by software, hardware, or a combination of software and hardware.

The system 100 may have a central location 101 (e.g., a headend), which may receive content from multiple sources. The central location 101 may combine the content from the various sources and may distribute the content to user (e.g., subscriber) locations (e.g., location 119) via a network 116.

The central location 101 may receive content from a variety of sources 102a, 102b, 102c. The content may be sent (e.g., transmitted) from the sources 102a, 102b, 102c to the central location 101 via a variety of transmission paths, such as wireless paths (e.g. satellite paths 103a, 103b) and terrestrial path 104. The central location 101 may also receive content from an input source 106 via a direct line 105 (e.g., one or more communication links and/or one or more communication paths). Other input sources may comprise capture devices, such as a video camera 109, a server 110, and/or the like. The content provided by the content sources may comprise a single content item, a portion of a content item (e.g., content fragment), a content stream, a multiplex that includes several content items, and/or the like.

The central location 101 may comprise one or a plurality of receivers 111a, 111b, 111c, 111d that are associated with one or more corresponding input sources. The central location 101 may comprise one or more encoders 112, switches 113, multiplexers, and/or the like. An encoder 112 may compress, encrypt, transform, and/or otherwise encode content. The encoder 112 may encode content based on one or more compression standards, such as MPEG. The encoder may receive content from the video camera 109 and/or other source and apply one or more encoding algorithms to the received content. A switch 113 may provide access to server 110, which may be a Pay-Per-View server, a data server, an internet router, a network system, a phone system, and the like. Some signals may require additional processing, such as signal multiplexing, prior to being modulated. Such multiplexing may be performed by multiplexer 114.

The central location 101 may comprise one or more modulators 115 for interfacing with the network 116. The one or more modulators 115 may receive content from a receiver 111, encoder 112, multiplexer 114, and/or the like. The one or more modulators 115 may convert the received content into a modulated output signal suitable for transmission over the network 116. The one or more modulators 115 may map portions of the content to data bits expressed as signals (e.g., sinusoidal signals) at corresponding subcarrier frequencies of a data symbol. The output signals from the modulators 115 may be combined, using equipment such as a combiner 117, for input into the network 116.

The network 116 may be a content delivery network, a content access network, and/or the like. The network 116 may be configured to provide content from a variety of sources using a variety of network paths, protocols, devices, and/or the like. The content delivery network and/or content access network may be managed (e.g., deployed, serviced) by a content provider, a service provider, and/or the like.

A control system 118 may permit a system operator to control and monitor the functions and performance of system 100. The control system 118 may interface, monitor, and/or control a variety of functions, including, but not limited to, the channel lineup for a television system, billing for each user, conditional access for content distributed to users, and the like. The control system 118 may provide input to the modulators for setting operating parameters, such as system specific MPEG table packet organization or conditional access information. The control system 118 may be located at central location 101 or at a remote location.

The network 116 may distribute content from the central location 101 to user locations, such as user location 119. The network 116 may be an optical fiber network, a coaxial cable network, a hybrid fiber-coaxial network, a wireless network, a satellite system, a direct broadcast system, or any combination thereof.

A multitude of users may be connected to the network 116. At the user location 119, a media device 120 may demodulate and/or decode, if needed, the signals for display on a display device 121, such as on a television set (TV) or a computer monitor. The media device 120 may be a demodulator, decoder, frequency tuner, and/or the like. The media device 120 may be directly connected to the network (e.g., for communications via in-band and/or out-of-band signals of a content delivery network) and/or connected to the network 116 via a communication terminal 122 (e.g., for communications via a packet switched network). The media device 120 may be a set-top box, a digital streaming device, a gaming device, a media storage device, a digital recording device, a computing device, a mobile computing device (e.g., a laptop, a smartphone, a tablet, etc.), a combination thereof, and/or the like. The media device 120 may implement one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or a satellite dish.

The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. The communication terminal 122, for a cable network, may be configured to provide network access via a variety of communication protocols and standards, such as Data Over Cable Service Interface Specification (DOCSIS).

A first access point 123 (e.g., a wireless access point) may be located at the user location 119. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The user location 119 is not necessarily fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park).

The system 100 may have an application server 126. The application server 126 may provide services related to applications. The application server 126 may have an application store. The application store may be configured to allow users to purchase, download, install, upgrade, and/or otherwise manage applications. The application server 126 may be configured to allow users to download applications to a device, such as the mobile device 124, communications terminal 122, the media device 120, the display device 121, and/or the like. The application server 126 may run one or more application services to provide data, handle requests, and/or otherwise facilitate operation of applications for the user.

The system 100 may have one or more content sources 127. The content source 127 may be configured to provide content (e.g., video, audio, games, applications, data) to the user. The content source 127 may be configured to provide streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may be configured to provide the content via a packet switched network path, such as via an internet protocol (IP) based connection. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like.

The system 100 may have an edge device 128. The edge device 128 may be configured to provide content, services, and/or the like to the user location 119. The edge device 128 may be one of a plurality of edge devices distributed across the network 116. The edge device 128 may be located in a region proximate to the user location 119. A request for content from the user may be directed to the edge device 128 (e.g., due to the location of the edge device and/or network conditions). The edge device 128 may be configured to package content for delivery to the user (e.g., in a specific format requested by a user device), provide the user a manifest file (e.g., or other index file describing portions of the content), provide streaming content (e.g., unicast, multicast), provide a file transfer, and/or the like. The edge device 128 may cache or otherwise store content (e.g., frequently requested content) to enable faster delivery of content to users.

For example, the edge device 128 may receive a plurality of representations of a content item. Each representation of the plurality of representations may correspond to a version of a same content item (e.g., a same episode of a television show, a same movie). Each representation of the plurality of representations may differ from other representations of the plurality of representations by one or more attributes, such as a different file format, a different bit rate, a different language, and/or the like. The edge device 128 may receive the plurality of representations from a transcoder, a combiner 117, a content source 127, and/or another device/component of the system 100. The edge device 128 may receive the plurality of representations as a plurality of Universal Datagram Protocol (UDP) packets. The edge device 128 may receive the plurality of representations in any format (e.g., UDP packets, etc.) and/or from any device/component of the system 100.

The edge device 128 may divide each of the plurality of representations into a respective plurality of segments. Each of the segments may correspond to a particular duration of content, e.g., one second of content, two seconds of content, or five seconds of content. Each of the segments may be identified by a file name. The file name may include an identifier of the particular representation of the content item to which it corresponds. The file name may also include a sequential identifier indicating where, in a sequence of segments of the content item, the particular segment lies. For example, the sequential identifier may correspond to an ordinal number or index, also called "number-based addressing." Thus, the fifth segment for a representation having an identifier of "123" may be named "segment_5_123.ts." As another example, the sequential identifier may correspond to a start time of the segment, also called "time-based addressing." For example, given segments of 2.002 seconds in duration (180180 ticks of a 90 KHz clock), the 42nd segment of representation "123" may be named "segment_7567560_123.ts."

The file name may include a per-segment parameter. A per-segment parameter may comprise a number, string, or other alphanumeric character combination that is applicable to all representations of a given segment of the content item. For example, assume that each segment of each representation corresponds to two variants in order to facilitate encoding a forensic watermarking identifying sequence. Assuming a number-based addressing scheme, a first variant of a fifth segment for a representation having an identifier of "123" may be named "segment_5_123_A.ts," and the second variant of the fifth segment of the representation may be named "segment_5_123_B.ts." Using this example, a first variant of a fifth segment for a representation having an identifier of "456" may be named "segment_5_456_A.ts," and the second variant of the fifth segment of the representation may be named "segment_5_456_B.ts." Here, the per-segment parameter is the character "A" or "B" used to identify a particular variant of the fifth segment across both representations.

It is understood that the use of "A" and "B" to identify particular variants is only exemplary. The per-segment parameters to identify variants may be random or semi-random strings, in order to obfuscate which variants are used to compose the identifying sequence. The per-segment parameter may also be different for each segment, but the same across all representations of that segment. For example, the pseudorandom strings "AKDHGF" and "JFUVH" may be the per-segment parameters for the fifth segment across all representations, while the pseudorandom strings "APDKLW" and "YRHFNV" may be the per-segment parameters for the sixth segment across all representations, and so forth.

The edge device 128 may generate a manifest file facilitating access to the respective plurality of segments for each of the plurality of representations (e.g., in response to a request for content). The manifest file may be generated as a tree or other hierarchy of elements. For example, for streaming content using DASH (Dynamic Adaptive Streaming over HTTP), the manifest file may include a Period element that describes a particular duration of the content item, e.g., a duration of the content item bound by a start time and an end time. The Period element may include, as child elements, Representation elements identifying each representation of the content item available during that duration. The Representation elements may describe various attributes of the corresponding representation of the content item, allowing for a user device to select a representation for streaming based on user device capabilities (e.g., display resolution, supported file formats) and available bandwidth. For example, the Representation element "<Representation id=415066 bandwidth=415066 width–320 height=576 framerate=24000/1001 codecs=avc1.4d401f/>" describes a representation having an id "415066," a bandwidth of 415066 bits per second, a resolution of 320×576, a framerate of 24 frames per second, and a codec avc1.4d401f.

The manifest file may include a template element. A template element may include placeholder parameters. To generate a request for a segment, the placeholder parameters may be replaced with real parameters (e.g., a representation identifier, a segment index, a segment start time, etc.) by a user device. The template element may include a placeholder parameter that may be replaced with a parameter value determined from a parameter file.

For example, using DASH, the SegmentTemplate element "<SegmentTemplate media="$RepresentationID$/$Number$_$VariantID$.ts"startNumber="1/> includes the "media" attribute. The placeholder parameters "RepresentationID," "Number," and $VariantID$ are denoted by being bound by the character "$." Using this SegmentTemplate element, a user device may generate a request for a particular segment number of a particular representation by replacing the placeholder elements with the respective representation identifier and segment number as dynamically determined by the user device. The "VariantID" placeholder parameter may be replaced with a parameter value determined from a parameter file. For example, assuming a parameter file indicating a parameter value of "XKCD" for the "VariantID," to request the fifth segment of representation "123," the user device would generate a request for "123/5_XKCD.ts." The SegmentTemplate element may be included in a same level or higher level in a tree structure of the manifest file. Thus, the SegmentTemplate is applicable to all representations (e.g, Representation elements) encoded at the same or lower levels of the manifest file.

The edge device 128 may also generate the parameter file (e.g., in response to a request for content). The parameter file may comprise a plurality of key-value pairs, with the key being a time range of a content item, and the value being a parameter value. For example, the parameter file may comprise entries indicating $[T_0, T_1]=V_1$, $[T_1, T_2]=V_2$, $[T_2, T_3]=V_3$. Thus, requests for segments between $T_0$, $T_1$ would include a parameter value $V_1$ requests for segments between $T_1$, $T_2$ would include a parameter value $V_2$, and requests for segments between $T_2$, $T_3$ would include a parameter value $V_3$. Where each segment, for all representations of the segment, corresponds to a different parameter value, each time range may correspond to a respective segment. Where one or more consecutive segments, for all representations of those segments, corresponds to a same parameter value, each time range may correspond to multiple segments.

To generate the parameter file (e.g., in response to the request for content), the edge device 128 may query a relational database or otherwise retrieve the key-value pairs to be included in the parameter file. For example, the parameter file and/or the manifest may be formatted in such a way as to enable database management software (e.g., DBMS) to search within the parameter file and/or the manifest. The parameter file and/or the manifest may be cached at the edge device 128 or at any other caching device of the system 100. The parameter file and/or the manifest may be provided either uncompressed or compressed (e.g., using one or more compression techniques known in the art). A reference to the parameter file may be included in the manifest file. Thus, a user device receiving the manifest file may request the parameter file based on the reference included in the manifest file. The reference and/or the parameter file may include a signature (e.g., a unique identifier). The signature may enable the user device and/or any other device of the system 100 to verify the authenticity of the reference and/or the parameter file.

A user device having both the manifest file and the parameter file may generate requests for content segments based on the manifest file and the parameter file. For example, assume a DASH manifest file having the SegmentTemplate element "<SegmentTemplate media="$RepresentationID$/$Number$_$VariantID$.ts"startNumber="1/>. The placeholder parameters "RepresentationID," "Number," and $VariantID$ are denoted by being bound by the character "$." Further assume that a fifth segment of a content item is included in the 90 KHz clock time range [450450,540540], corresponding to the parameter value "ASDF" as indicated in a parameter file. The user device may determine the start time of the fifth segment (e.g., at index 5). For example, assuming a timeline based on a 90 KHz clock and content segments having a duration of one second, the start time of the fifth segment may be calculated as 5*90090=450450. The user device may access the parameter file to find the time range including the start time of the fifth segment (e.g., [450450, 540540]) and the corresponding parameter value (e.g., "ASDF"). The user device may generate a request for the fifth content segment of representation "123" by generating a request for "123/5_ASDF.ts").

During a content stream, an updated manifest file may be sent to the user device. The user device may generate subsequent requests based on the updated manifest file, but using the parameter file requested based on the initial manifest file. Thus, network bandwidth and computational resources are saved by only requiring the template-based (and reduced size) manifest file to be updated.

The network 116 may have a network component 129. The network component 129 may be any device, module, and/or the like communicatively coupled to the network 116. The network component 129 may be a router, a switch, a splitter, a packager, a gateway, a encoder, a storage device, a multiplexer, a network access location (e.g., tap), physical link, and/or the like.

In addition to requesting and providing content segments, the system 100 may apply the methods described herein to any object store known in the art (e.g., object-based storage). An object-based storage system may utilize an architecture that manages data as objects, as opposed to other storage architectures like file systems, which manage data as a file hierarchy, and/or block storage, which manages data as blocks within sectors and tracks. For example, the methods described herein may be applied to an object store by providing object identifiers within the parameter file. In this way, a manifest file may correspond to multiple objects within the object store. Each object may be a version of a same file/data, and each object may therefore vary in format, compression, combinations thereof, and/or the like. Each object may be divided into subsets (e.g., portions of the object). The manifest file may describe each object and include a location identifier for each object and/or subset thereof (e.g., a URL, network path, file path, etc.). The location identifier(s) may be used by the user device to generate requests for subsets (e.g., portions) of an object. The manifest file may be encoded as a tree of elements (e.g., one or more parent or high-level elements, each of which may include one or more child or lower-level elements) using Extensible Markup Language (XML) or another format.

Further, the methods described herein may be applied in conjunction with URL signing techniques known in the art. For example, a plurality of tokens may be provided in the parameter file that are each unique to one or more segments of content. When the plurality of tokens are provided in the parameter file, URL signing may be used to authenticate each token to ensure that only requests with a valid token (e.g., a signature or hash) are permitted to receive a requested content segment. Each token may include an expiration time and/or allowed/denied IP addresses (e.g., corresponding to one or more user devices). In this way, an authenticated user device may generate a request for a content segment by modifying a URL indicated in the manifest file to include a determined parameter value based on the parameter file and the corresponding token associated with the requested content segment. This may enable the system 100 to ensure that only the authenticated user device is permitted to access the requested content segment and to prevent the requested content segment from being shared with other user devices that do not possess the corresponding token (e.g., unauthenticated devices).

Figure 2:
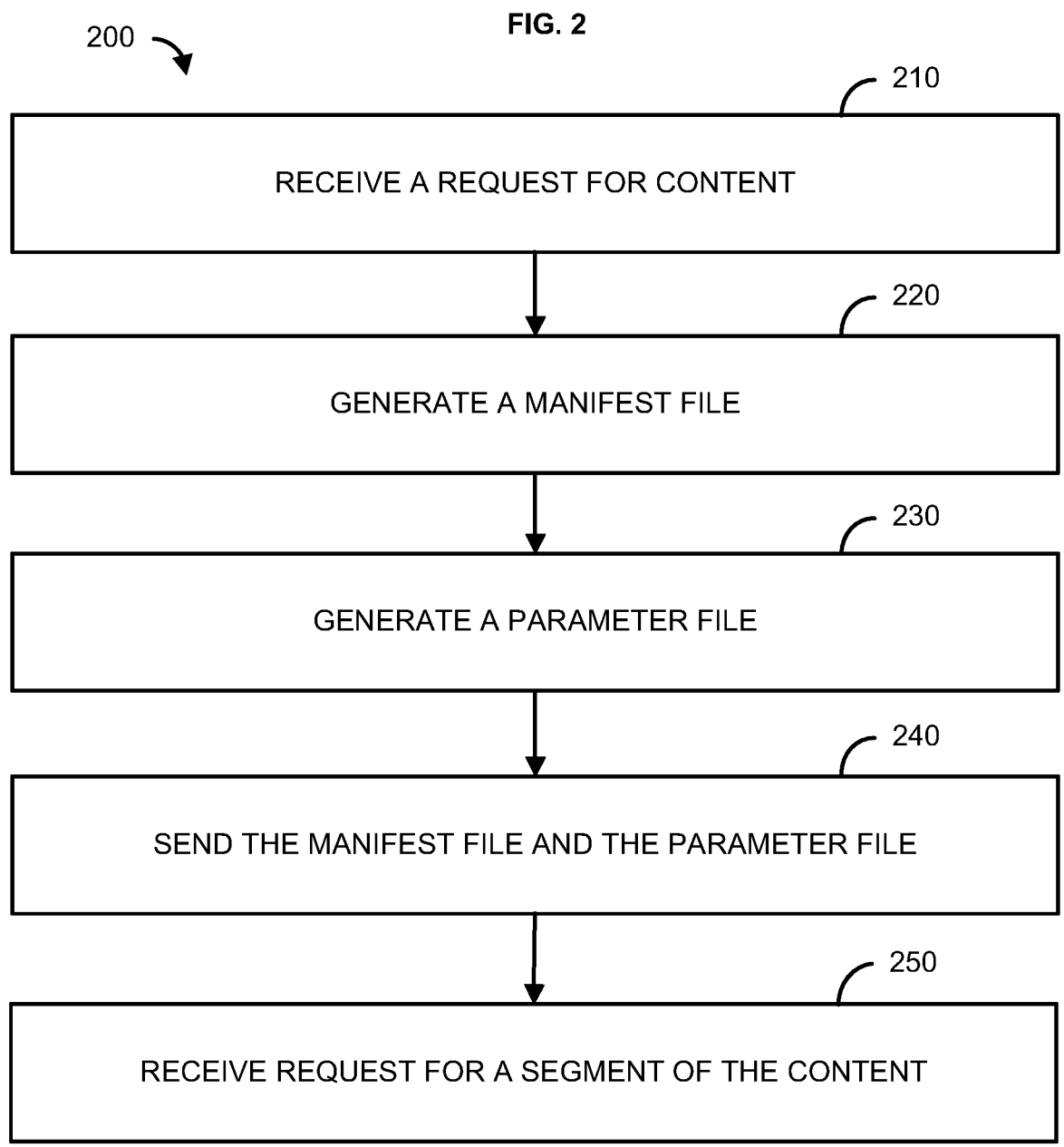
FIG. 2 shows a flowchart of a method.

FIG. 2 is a flowchart of an example method 200. At step 200 a request for content may be received (e.g., by an edge device 128 from a user device). At step 220 a manifest file may be generated (e.g., by the edge device 128). The manifest file may facilitate access to a respective plurality of segments for each of a plurality of representations (e.g., based on the request for content). For example, the manifest file may include and/or indicate reference information. The reference information may include one or more references (e.g., Uniform Resource Locators (URLs) to the content, representations of the content, and/or segments of the content. The manifest file may be generated as a tree or other hierarchy of elements. For example, for streaming content using DASH (Dynamic Adaptive Streaming over HTTP), the manifest file may include a Period element that describes a particular duration of the content item, e.g., a duration of the content item bound by a start time and an end time. The Period element may include, as child elements, Representation elements identifying each representation of the content item available during that duration. The Representation elements may describe various attributes of the corresponding representation of the content item, allowing for a user device to select a representation for streaming based on user device capabilities (e.g., display resolution, supported file formats) and available bandwidth. For example, the Representation element "<Representation id=415066 bandwidth=415066 width-320 height=576 framerate=24000/1001 codecs=avc1.4d401f/>" describes a representation having an id "415066," a bandwidth of 415066 bits per second, a resolution of 320×576, a framerate of 24 frames per second, and a codec avc1.4d401f.

The manifest file may include a template element that includes placeholder parameters. The placeholder parameters may be replaced with real parameters (e.g., a representation identifier, a segment index, and/or a segment start time) by a user device to generate a request for a segment. The template element may also include a placeholder parameter to be replaced with a parameter value determined from a parameter file. Accordingly, the manifest file may include a reference (e.g., a URL) to a parameter file.

For example, using DASH, the SegmentTemplate element "<SegmentTemplate media="$RepresentationID$/$Number$_$VariantID$.ts"startNumber="1/> includes the "media" attribute. The placeholder parameters "RepresentationID," "Number," and $VariantID$ are denoted by being bound by the character "$." The "VariantID" placeholder parameter may be replaced with a parameter value determined from a parameter file. The SegmentTemplate element may be included in a same level or higher level in a tree structure of the manifest file. Thus, the SegmentTemplate is applicable to all representations (e.g, Representation elements) encoded at the same or lower levels of the manifest file.

At step 230 the parameter file may be generated (e.g., by the edge device 128). The parameter file may comprise a plurality of key-value pairs, with the key being a time range of a content item, and the value being a parameter value. For example, the parameter file may comprise entries indicating $[T_0, T_1]=V_1$, $[T_1, T_2]=V_2$, $[T_2, T_3]=V_3$. Thus, requests for segments between $T_0$, $T_1$ would include a parameter value $V_1$ requests for segments between $T_1$, $T_2$ would include a parameter value $V_2$, and requests for segments between $T_2$, $T_3$ would include a parameter value $V_3$. Where each segment, for all representations of the segment, corresponds to a different parameter value, each time range may correspond to a respective segment. Where one or more consecutive segments, for all representations of those segments, corresponds to a same parameter value, each time range may correspond to multiple segments. Generating the parameter file may include querying a relational database or otherwise retrieving the key-value pairs to be included in the parameter file.

At step 240 the manifest file and the parameter file may be sent (e.g., by the edge device 128 to the user device). For example, the manifest file including a reference to the parameter file may be sent to the user device. The user device may access the manifest file to generate a request for the parameter file. The parameter file may be sent to the user device based on the request for the parameter file.

At step 250 a request for a segment of the content may be received (e.g., by the edge device 128, from the user device). The request may be based on a URL included in the manifest file and a parameter value indicated in the parameter file. For example, assume a DASH SegmentTemplate element "<SegmentTemplate media="$RepresentationID$/$Number$_$VariantID$.ts"startNumber="1/>. A user device may generate a request for a particular segment number of a particular representation by replacing the placeholder elements with the respective representation identifier and segment number as dynamically determined by the user device. The "VariantID" placeholder parameter may be replaced with a parameter value determined from a parameter file. For example, assuming a parameter file indicating a parameter value of "XKCD" for the "VariantID," to request the fifth segment of representation "123," the user device would generate a request for "123/5_XKCD.ts."

Figure 3:
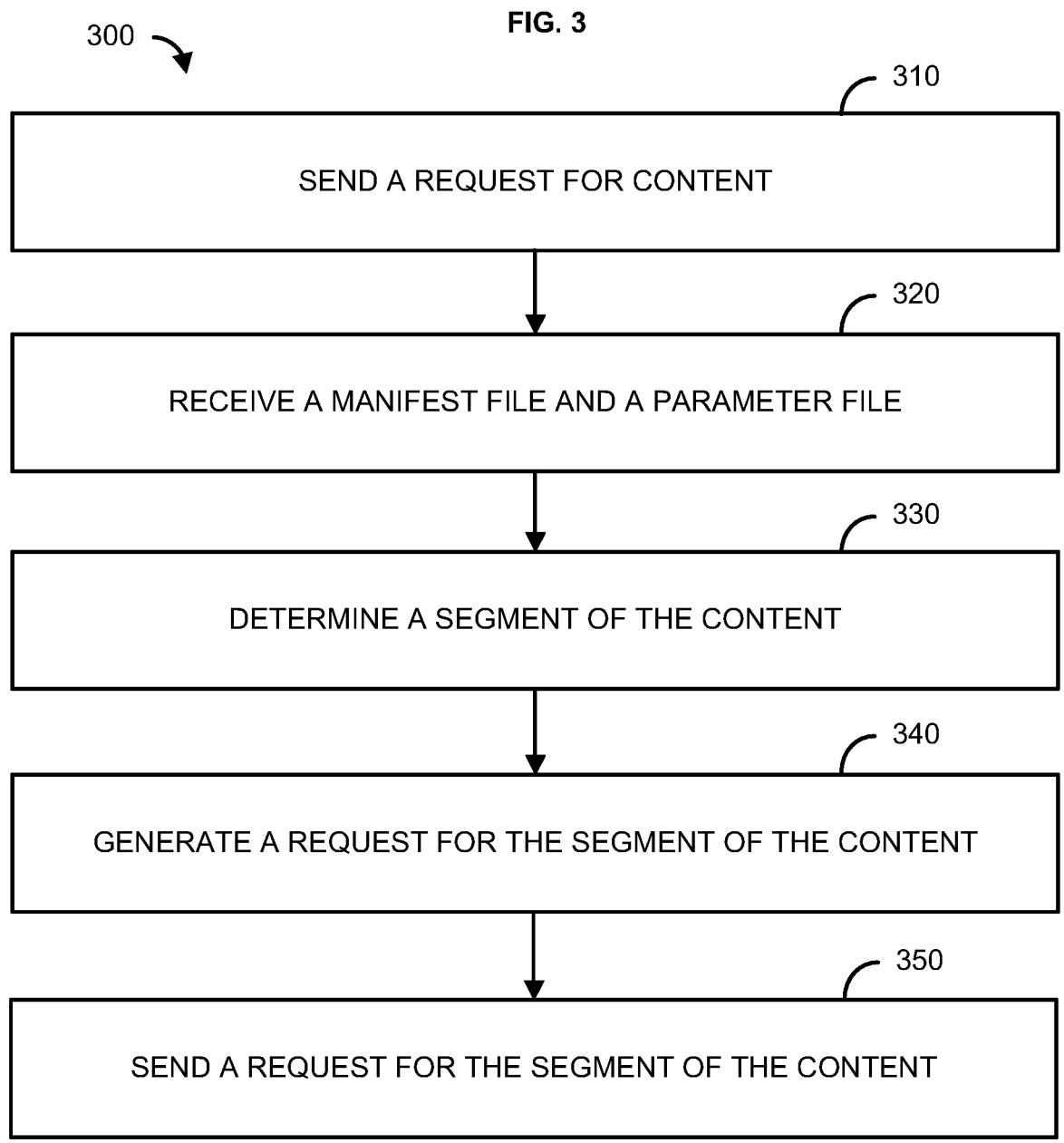
FIG. 3 shows a flowchart of a method.

FIG. 3 is a flowchart of an example method 300. At step 300 a request for content may be sent (e.g., to an edge device 128 by a user device). At step 320 a manifest file and a parameter file may be received (e.g., by the user device from the edge device 128). The manifest file may facilitate access to a respective plurality of segments for each of a plurality of representations (e.g., based on the request for content). For example, the manifest file may include and/or indicate reference information. The reference information may include one or more references (e.g., Uniform Resource Locators (URLs), etc.) to the content, representations of the content, and/or segments of the content. The manifest file may be generated as a tree or other hierarchy of elements. For example, for streaming content using DASH (Dynamic Adaptive Streaming over HTTP), the manifest file may include a Period element that describes a particular duration of the content item, e.g., a duration of the content item bound by a start time and an end time. The Period element may include, as child elements, Representation elements identifying each representation of the content item available during that duration. The Representation elements may describe various attributes of the corresponding representation of the content item, allowing for a user device to select a representation for streaming based on user device capabilities (e.g., display resolution, supported file formats) and available bandwidth. For example, the Representation element "<Representation id=415066 bandwidth=415066 width–320 height=576 framerate=24000/1001 codecs=avc1.4d401f/>" describes a representation having an id "415066," a bandwidth of 415066 bits per second, a resolution of 320×576, a framerate of 24 frames per second, and a codec avc1.4d401f.

The manifest file may include a template element that includes placeholder parameters. The placeholder parameters may be replaced with real parameters (e.g., a representation identifier, a segment index, and/or a segment start time) by a user device to generate a request for a segment. The template element may also include a placeholder parameter to be replaced with a parameter value determined from a parameter file. Accordingly, the manifest file may include a reference (e.g., a URL) to a parameter file.

The parameter file may comprise a plurality of key-value pairs, with the key being a time range of a content item, and the value being a parameter value. For example, the parameter file may comprise entries indicating $[T_0, T_1]=V_1$, $[T_1, T_2]=V_2$, $[T_2, T_3]=V_3$. Thus, requests for segments between $T_0, T_1$ would include a parameter value $V_1$ requests for segments between $T_1, T_2$ would include a parameter value $V_2$, and requests for segments between $T_2, T_3$ would include a parameter value $V_3$. Where each segment, for all representations of the segment, corresponds to a different parameter value, each time range may correspond to a respective segment. Where one or more consecutive segments, for all representations of those segments, corresponds to a same parameter value, each time range may correspond to multiple segments. Generating the parameter file may include querying a relational database or otherwise retrieving the key-value pairs to be included in the parameter file.

Receiving the manifest file and the parameter file may include receiving the manifest file and accessing the manifest file to determine a reference to the parameter file. Based on the parameter file, a request for the parameter file may be sent. The parameter file may be received based on the request for the parameter file.

At step 330 a segment of the content may be determined. The segment of the content may be a next segment in a sequence of content. For example, assuming number-based addressing for segments and a last-requested segment at index N, the segment may be determined as a segment at index N+1. As another example, assuming time-based addressing for segments and a last-requested segment at time T, the segment may be determined as a segment at time T+(segment_duration*clock), where "segment_duration" is the duration of segments (e.g., one second, two seconds) and "clock" is a clock speed expressed in Hz.

At step 340 a request for a segment of the content may be generated (e.g., by the user device). The request may be based on the reference information, such as a URL included in the manifest file, and a parameter value indicated in the parameter file. For example, assume a DASH manifest file having the SegmentTemplate element "<SegmentTemplate media="$RepresentationID$/$Number$_$VariantID$.ts"startNumber="1/>. The placeholder parameters "RepresentationID," "Number," and $VariantID$ are denoted by being bound by the character "$." Further assume that a fifth segment of a content item is included in the 90 KHz clock time range [450450,540540], corresponding to the parameter value "ASDF" as indicated in a parameter file. The user device may determine the start time of the fifth segment (e.g., at index 5). For example, assuming a timeline based on a clock and content segments having a duration of one second, the start time of the fifth segment may be calculated as 5*90090=450450. The user device may access the parameter file to find the time range including the start time of the fifth segment (e.g., [450450,540540]) and the corresponding parameter value (e.g., "ASDF"). The user device may generate a request for the fifth content segment of representation "123" by generating a request for "123/5_ASDF.ts"). At step 350 the request for the segment of the content may be sent (e.g., by the user device to the edge device 128).

Figure 4:
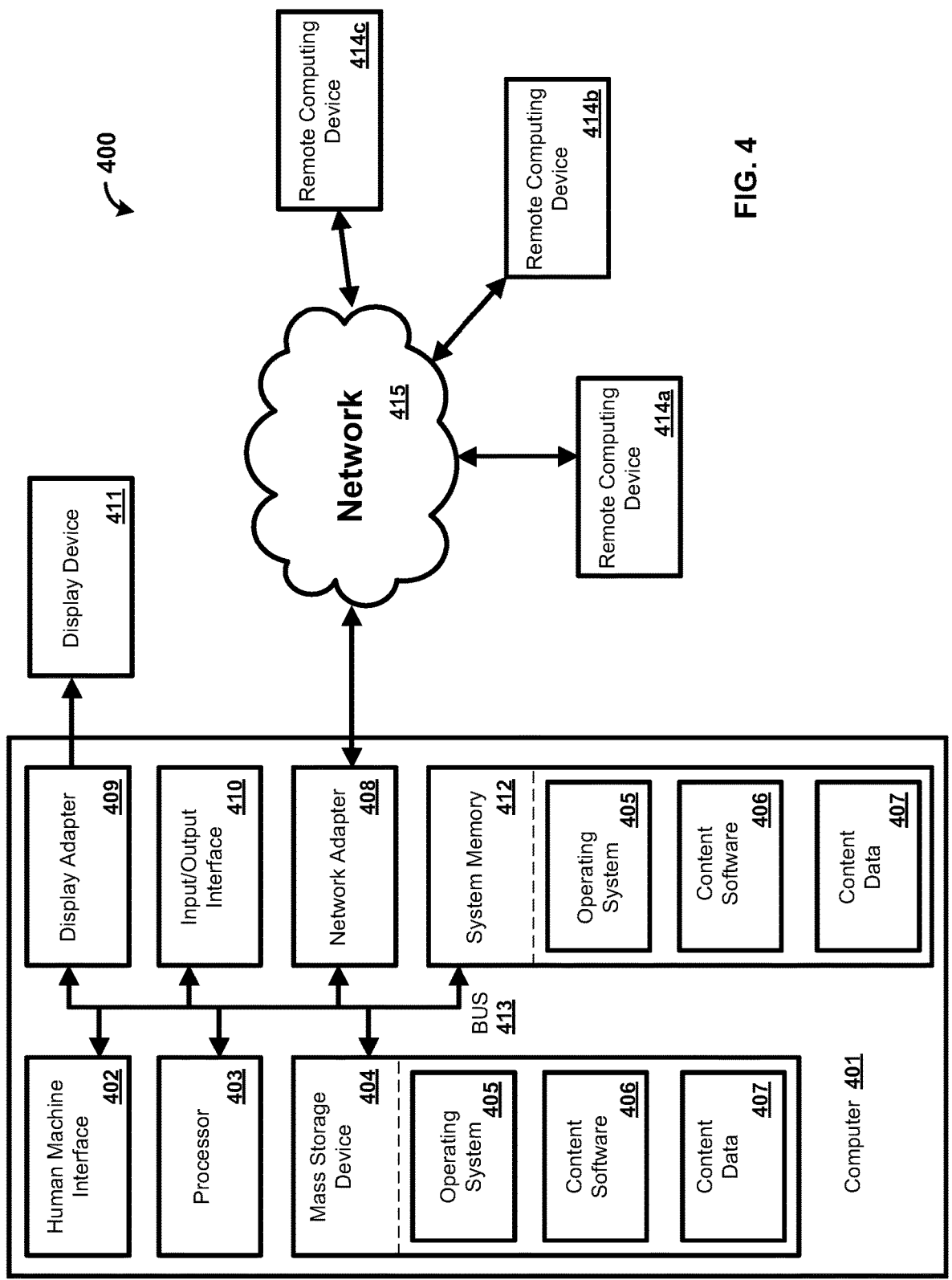
FIG. 4 shows a block diagram of a computing device.

FIG. 4 shows a system 400. The server 110, the application server 126, the content source 127, or the edge device 128 of FIG. 1 may be a computer 401 as shown in FIG. 4.

The computer 401 may comprise one or more processors 403, a system memory 412, and a bus 413 that couples various components of the computer 401 including the one or more processors 403 to the system memory 412. In the case of multiple processors 403, the computer 401 may utilize parallel computing.

The bus 413 may comprise one or more of several possible types of bus structures, such as a memory bus, memory controller, a peripheral bus, an accelerated graphics port, and a processor or local bus using any of a variety of bus architectures.

The computer 401 may operate on and/or comprise a variety of computer readable media (e.g., non-transitory). Computer readable media may be any available media that is accessible by the computer 401 and comprises, non-transitory, volatile and/or non-volatile media, removable and non-removable media. The system memory 412 has computer readable media in the form of volatile memory, such as random access memory (RAM), and/or non-volatile memory, such as read only memory (ROM). The system memory 412 may store data such as content data 407 and/or program modules such as operating system 405 and content software 406 that are accessible to and/or are operated on by the one or more processors 403.

The computer 401 may also comprise other removable/non-removable, volatile/non-volatile computer storage media. The mass storage device 404 may provide non-volatile storage of computer code, computer readable instructions, data structures, program modules, and other data for the computer 401. The mass storage device 404 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 404. An operating system 405 and content software 406 may be stored on the mass storage device 404. One or more of the operating system 405 and content software 406 (or some combination thereof) may comprise program modules and the content software 406. Content data 407 may also be stored on the mass storage device 404. The content data 407 may be stored in any of one or more databases known in the art. The databases may be centralized or distributed across multiple locations within the network 415.

A user may enter commands and information into the computer 401 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 403 via a human machine interface 402 that is coupled to the bus 413, but may be connected by other interface and bus structures, such as a parallel port, game port, an IEEE 1394 Port (also known as a Firewire port), a serial port, network adapter 408, and/or a universal serial bus (USB).

A display device 411 may also be connected to the bus 413 via an interface, such as a display adapter 409. It is contemplated that the computer 401 may have more than one display adapter 409 and the computer 401 may have more than one display device 411. A display device 411 may be a monitor, an LCD (Liquid Crystal Display), light emitting diode (LED) display, television, smart lens, smart glass, and/or a projector. In addition to the display device 411, other output peripheral devices may comprise components such as speakers (not shown) and a printer (not shown) which may be connected to the computer 401 via Input/Output Interface 410. Any step and/or result of the methods may be output (or caused to be output) in any form to an output device. Such output may be any form of visual representation, including, but not limited to, textual, graphical, animation, audio, tactile, and the like. The display 411 and computer 401 may be part of one device, or separate devices.

The computer 401 may operate in a networked environment using logical connections to one or more remote computing devices 414a,b,c. A remote computing device 414a,b,c may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 401 and a remote computing device 414a,b,c may be made via a network 415, such as a local area network (LAN) and/or a general wide area network (WAN). Such network connections may be through a network adapter 408. A network adapter 408 may be implemented in both wired and wireless environments. Such networking environments are conventional and commonplace in dwellings, offices, enterprise-wide computer networks, intranets, and the Internet.

Application programs and other executable program components such as the operating system 405 are shown herein as discrete blocks, although it is recognized that such programs and components may reside at various times in different storage components of the computing device 401, and are executed by the one or more processors 403 of the computer 401. An implementation of content software 406 may be stored on or sent across some form of computer readable media. Any of the disclosed methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. One or more non-transitory computer-readable media storing processor-executable instructions that, when executed by one or more processors, cause the one or more processors to:
   generate a manifest file for content, wherein the content comprises a plurality of segments, and wherein the manifest file comprises at least one placeholder parameter for each segment of the plurality of segments;
   generate, based on the manifest file, a parameter file comprising:
      a plurality of time ranges associated with the plurality of segments, and
      a plurality of parameter values associated with the plurality of time ranges; and
   send, to a computing device, the manifest file and the parameter file, wherein the computing device is configured to request a first segment of the plurality of segments based on the parameter file and the at least one placeholder parameter for the first segment indicated by the manifest file.

2. The one or more non-transitory computer-readable media of claim 1, wherein each segment of the plurality of segments is associated with at least one representation, and wherein the at least one placeholder parameter for each segment of the plurality of segments is associated with the at least one representation for that segment.

3. The one or more non-transitory computer-readable media of claim 1, wherein the first segment is associated with: a first start time indicated by the manifest file and a first time range of the plurality of time ranges indicated by the parameter file, and wherein the first time range comprises the first start time.

4. The one or more non-transitory computer-readable media of claim 1, wherein the computing device is configured to:
   determine, based on a first start time associated with the first segment indicated by the manifest file, a first time range of the plurality of time ranges, wherein the first time range is indicated by the parameter file; and
   determine, based on the first time range, at least one parameter value of the plurality of parameter values indicated by the parameter file, wherein the at least one parameter value is associated with the at least one placeholder parameter for the first segment.

5. The one or more non-transitory computer-readable media of claim 1, wherein the computing device is configured to:
   determine, based on the manifest file, a first time range of the plurality of time ranges;
   determine, based on the first time range, at least one parameter value of the plurality of parameter values indicated by the parameter file, wherein the at least one parameter value is associated with the at least one placeholder parameter for the first segment; and
   determine, based on the at least one placeholder parameter for the first segment, an identifier for the first segment, wherein the identifier comprises the at least one parameter value.

6. The one or more non-transitory computer-readable media of claim 1, wherein the processor-executable instructions further cause the one or more processors to:
   receive, from the computing device, a request for the first segment; and
   send, based on the request, the first segment to the computing device.

7. The one or more non-transitory computer-readable media of claim 6, wherein the first segment is associated with a first time range of the plurality of time ranges, and wherein the request comprises at least one parameter value of the plurality of parameter values associated with: the first time range and the at least one placeholder parameter for the first segment.

8. The one or more non-transitory computer-readable media of claim 1, wherein the computing device generates, based on the parameter file and the at least one placeholder parameter for the first segment indicated by the manifest file, a request for the first segment.

9. One or more non-transitory computer-readable media storing processor-executable instructions that, when executed by one or more processors, cause the one or more processors to:
   determine, based on a manifest file for content, a start time of a first segment of a plurality of segments of the content, wherein the manifest file comprises at least one placeholder parameter for each segment of the plurality of segments;
   determine, based on the start time of the first segment, a first time range indicated by a parameter file for the content, wherein the first time range comprises the start time, and wherein the first time range is associated with at least one parameter value indicated by the parameter file; and
   send, based on the at least one parameter value and the at least one placeholder parameter for the first segment, a request for the first segment, wherein the request comprises the at least one parameter value.

10. The one or more non-transitory computer-readable media of claim 9, wherein the parameter file comprises a parameter value for the at least one placeholder parameter for each segment of the plurality of segments.

11. The one or more non-transitory computer-readable media of claim 9, wherein each segment of the plurality of segments is associated with at least one representation, and wherein the at least one placeholder parameter for the first segment is associated with the at least one representation.

12. The one or more non-transitory computer-readable media of claim 9, wherein the processor-executable instructions that cause the one or more processors to send the request further cause the one or more processors to:
   determine, based on the at least one placeholder parameter for the first segment, an identifier for the first segment, wherein the request comprises the identifier.

13. One or more non-transitory computer-readable media storing processor-executable instructions that, when executed by one or more processors, cause the one or more processors to:
   receive a request for content;
   generate, based on the request, a manifest file associated with the content;
   generate a parameter file comprising a plurality of parameter values and a plurality of time ranges, wherein each time range of the plurality of time ranges corresponds to a parameter value of the plurality of parameter values;
   send, to a user device, the manifest file and the parameter file; and
   receive, from the user device, a request for a segment of the content comprising a first parameter value of the plurality of parameter values, wherein the segment is associated with a time value, and wherein the first parameter value corresponds to a first time range of the plurality of time ranges based on the time value.

14. The one or more non-transitory computer-readable media of claim 13, wherein the manifest file comprises a reference to the parameter file.

15. The one or more non-transitory computer-readable media of claim 14, wherein the processor-executable instructions that cause the one or more processors to send the manifest file and the parameter file further cause the one or more processors to:
   send, based on the request for the content, the manifest file;
   receive, based on the reference to the parameter file, a request for the parameter file; and
   send the parameter file.

16. The one or more non-transitory computer-readable media of claim 13, wherein the request for the segment comprises an identifier for the segment, and wherein the identifier comprises the first parameter value.

17. The one or more non-transitory computer-readable media of claim 13, wherein the processor-executable instructions further cause the one or more processors to:
   send, to the user device, an updated manifest file; and
   receive, based on another parameter value of the plurality of parameter values, a request for another segment of the content.

18. The one or more non-transitory computer-readable media of claim 13, wherein the processor-executable instructions that cause the one or more processors to generate the parameter file further cause the one or more processors to determine, based on a relational database, the plurality of parameter values.

19. The one or more non-transitory computer-readable media of claim 13, wherein the manifest file comprises an MPEG DASH manifest file.

20. One or more non-transitory computer-readable media storing processor-executable instructions that, when executed by one or more processors, cause the one or more processors to:
   send a request for content;
   receive, based on the request for the content, a manifest file and a parameter file, wherein the parameter file comprises a plurality of parameter values and a plurality of time ranges associated with the content, wherein each time range of the plurality of time ranges corresponds to a parameter value of the plurality of parameter values;
   determine a segment of the content associated with a time value;
   generate, based on the time value, a request for the segment of the content comprising a first parameter value of the plurality of parameter values, wherein the first parameter value corresponds to a first time range of the plurality of time ranges based on the time value; and
   send the request for the segment of the content.

21. The one or more non-transitory computer-readable media of claim 20, wherein the request for the segment comprises an identifier for the segment, and wherein the identifier comprises the first parameter value.

22. The one or more non-transitory computer-readable media of claim 20, wherein the processor-executable instructions further cause the one or more processors to:
   determine the time value associated with the segment of the content;
   determine, based on the time value, the first time range of the plurality of time ranges; and
   determine, based on the first time range, the first parameter value of the plurality of parameter values.

23. The one or more non-transitory computer-readable media of claim 20, wherein the processor-executable instructions that cause the one or more processors to receive the manifest file and the parameter file further cause the one or more processors to:
   receive the manifest file;
   send, based on a reference to the parameter file in the manifest file, a request for the parameter file; and
   receive, based on the request for the parameter file, the parameter file.

24. The one or more non-transitory computer-readable media of claim 20, wherein the processor-executable instructions that cause the one or more processors to generate the request for the segment of the content further cause the one or more processors to modify an identifier for the segment to include the first parameter value.

25. The one or more non-transitory computer-readable media of claim 20, wherein the processor-executable instructions further cause the one or more processors to receive an updated manifest file, wherein the updated manifest file references the parameter file.

26. The one or more non-transitory computer-readable media of claim 25, wherein the processor-executable instructions further cause the one or more processors to:
   determine another segment of the content;
   generate, based on the updated manifest file and another parameter value of the plurality of parameter values, a request for the another segment of the content; and
   send the request for the another segment of the content.

* * * * *